United States Patent [19]

Bodlaj

[11] 4,212,534
[45] Jul. 15, 1980

[54] DEVICE FOR CONTACT-FREE MEASURING OF THE DISTANCE OF A SURFACE OF AN OBJECT FROM A REFERENCE PLANE

[75] Inventor: Viktor Bodlaj, Munich, Fed. Rep. of Germany

[73] Assignee: Siemens Aktiengesellschaft, Berlin & Munich, Fed. Rep. of Germany

[21] Appl. No.: 933,070

[22] Filed: Aug. 11, 1978

[30] Foreign Application Priority Data

Sep. 30, 1977 [DE] Fed. Rep. of Germany ....... 2744130

[51] Int. Cl.² .......................... G01C 3/00; G01C 3/08
[52] U.S. Cl. .......................................... 356/1; 356/4; 356/381
[58] Field of Search ...................... 356/1, 4, 5, 28, 381

[56] References Cited

U.S. PATENT DOCUMENTS

| | | | |
|---|---|---|---|
| 3,923,395 | 12/1975 | Bodlaj | 356/4 |
| 3,954,335 | 5/1976 | Bodlaj | 356/4 |
| 4,053,227 | 10/1977 | Bodlaj | 356/4 |

FOREIGN PATENT DOCUMENTS 2508836  9/1976  Fed. Rep. of Germany .............. 356/1

Primary Examiner—S. C. Buczinski
Attorney, Agent, or Firm—Hill, Van Santen, Steadman, Chiara & Simpson

[57] ABSTRACT

A device for contact-free measuring of the distance of an object surface from a reference plane by deflecting a beam of light in a path and detecting a beam reflected along a given line of sight by a detector characterized by providing means for measuring the interval of time for travel of the deflected light beam between at least two specific directions of the beam and between at least one of the two directions and a direction at which the photo detector responds and utilizes the time intervals to determine the speed of deflection and determine the distance of the surface from the reference plane.

10 Claims, 1 Drawing Figure

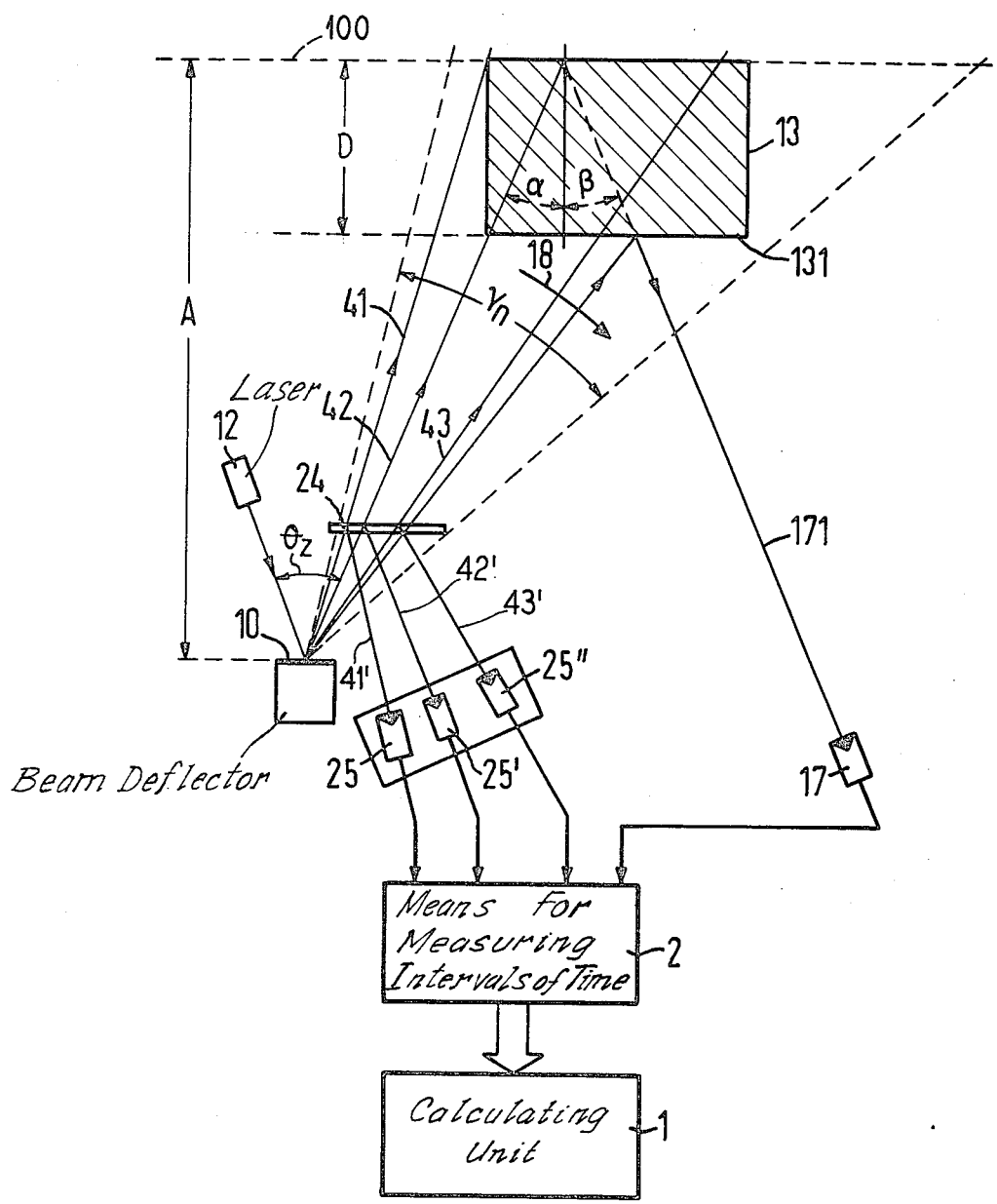

DEVICE FOR CONTACT-FREE MEASURING OF THE DISTANCE OF A SURFACE OF AN OBJECT FROM A REFERENCE PLANE

BACKGROUND OF THE INVENTION

The present invention is directed to a device for measuring the distance of a surface of an object from a reference plane, which device has a light source producing a sharply focused light beam, a beam deflector which serves to deflect the beam and to repeatedly pass it over the surface of the object, a photo detector which responds only to light which reaches it along a given direction or sighting line and means for determining the distance of the surface from the reference plane in response to a signal from the detector.

A device for measuring the distance of a surface of an object from a reference plane which device utilizes a light source such as a laser for producing a sharply focused light beam, has a light deflector for deflecting the light beam along a given path, has a photo detector which will produce a signal when light reaches it along a sighting line of a given direction and has means for determining the distance based on the response from the signal detector is known and disclosed for example in German Offenlegungsschrift 25,08,836, which is an improvement of a measuring device disclosed in U.S. Pat. No. 3,954,335. In the device of the German Offenlegungsschrift, a beam divider is disposed in the path of the deflected beam to branch off partial light beams and two additional photo detectors, which will respond to a beam of light along a given direction, are provided. These additional photo detectors are arranged in such a way that they will receive the branch off sub-beams as the beam is deflected in two given angularly spaced positions. This device serves to stabilize the deflection speed of the light beam so that a permanently high degree of measuring accuracy can be achieved. For this purpose, the known device is operated in such a manner that the interval of time between a time at which one of the two additional photo detectors receives a branched or reflected sub-beam and the time at which the second of the two additional photo detectors receives a branched sub-beam is monitored. In the event that this time difference deviates from a theoretical value, the controls of the beam deflector are changed or regulated to cause the beam deflector to deflect the beam at a theoretical or desired speed.

SUMMARY OF THE INVENTION

The present invention is directed to an improved device for measuring the distance of a surface from a reference plane which device enables a correct measuring of the distance to be determined independently of the deflection speed of the light beam.

To accomplish these aims, the improvement is in a device which has a light source which produces a sharply focused light beam; a beam deflector which serves to deflect the light beam and to repeatedly pass it over the surface; a photo detector, which, within a prescribed angle limit, responds only to light which reaches it along a sighting line or from a given direction, said photo detector being arranged with its sighting line or given direction being aligned to the surface of the object to be measured and to be intersected at least zone-wise by a light beam which passes over the surface; and means for determining the distance from the surface from the reference plane in response to a signal from the detector. The improvement comprises means for measuring the intervals of time for travel of the deflected light beam between at least two specific directions of the beam and between at least one of said two directions and a direction at which the photo detector responds and said means for determining utilizes the time intervals to determine the speed of deflection and determine the distance D of the surface from the reference plane. Preferably, the means for measuring the interval of time of travel of the deflected light beam between specific directions as the beam is deflected across the surface and provides a time difference $\Delta t_R$, which is the time of travel for the beam between a first predetermined fixed direction and a second predetermined fixed direction, a time $\Delta t_{ZDA}$, which is the time for the beam to move between the second direction and a third predetermined fixed direction, and a time difference $\Delta t_d$ which is the time for movement between the third direction and the time at which the photo detector receives a reflected beam from the surface and the means for determining utilizing the time differences $\Delta t_R$, $\Delta t_{ZDA}$ and $\Delta t_d$ as varying values determines the distance D in accordance with $$\text{distance } D = \frac{A \cdot \cos\beta \cdot \sin[B \cdot \frac{\Delta t_{ZDA}}{\Delta t_R}(c - C\frac{\Delta t_d}{\Delta t_R})]}{\cos\alpha \cdot \sin[\alpha + \beta + B\frac{\Delta t_{ZDA}}{\Delta t_R}(c - C\frac{\Delta t_d}{\Delta t_R})]}$$

wherein A, B, C, c, $\alpha$ and $\beta$ are constants determined by their relationship with the components of the device and $\pi$ is the Ludorf coefficient, which constitutes a fixed calculated value.

The means for measuring intervals of time of travel preferably includes three signal generators, which are additional photo detectors having sighting lines or which receive light traveling along a given direction and a beam splitter is placed in the path of the deflected beam so that a partial beam is reflected at a respective additional photo detector as the beam assumes the given specific direction. The measuring means also includes at least one counter, with the counter being reset to a fixed starting value and being readable in parallel. The counter is started and/or stopped and read out in parallel by a signal from the means for generating a signal assigned to the first direction, the counter is initially stopped, read out in parallel and then restarted by a signal from the means for generating a signal assigned to each of the second and third directions and can be stopped, read out in parallel and started by a signal from the photo detector which receives a light reflected from the surface of the object. The means for determining, which utilizes the time intervals from the means for measuring time intervals, preferably is a digital computer such as a micro-processer.

BRIEF DESCRIPTION OF THE DRAWINGS

The FIGURE schematically illustrates an exemplary embodiment of the present invention.

DESCRIPTION OF THE PREFERRED EMBODIMENT

The principles of the present invention are particularly useful in a measuring device illustrated in the figure. The device includes a light source 12 such as a laser, which produces a sharply focused light beam, and a beam deflector 10 which may be a piezoelecgtric device and serves to deflect the light beam in an angle range $\gamma_n$ within a plane. In addition, a detector 17, which is of the type that will receive light coming along a given direction such as 171. which is the sighting line of the detector, is utilized. The detector 17, the beam deflector 10 and the light source 12 are known in these types of devices and are further described in the above mentioned U.S. Pat. No. 3,954,335 which describes two types of deflector. One type only allows measuring as the beam moves in one direction 18 and the other allows measuring in both directions.

The object 13, whose surface 131 is to be measured with regard to its distance D from a reference plane 100, is disposed in the path of the beam so that the surface 131, which possesses a diffusedly reflective property, will be scanned by the deflected beam. When the photo detector receives the reflected beam from the surface 131, which is in the direction of the sighting line 171, it will create a signal which is applied to a means for measuring intervals of time which is illustrated as including the box 2.

The means for measuring the intervals of time in addition includes means for detecting when the beam is deflected in a first, second and third predtermined fixed directions, such as 41, 42 and 43. The means for measuring includes a beam divider 24, which is positioned in the path of the deflected beam so that it reflects a sub-beam or partial beam 41' when the beam reaches the first predetermined direction 41, a partial beam 42' for the second direction 42 and a partial beam 43' for the third predetermined direction 43. In addition, means for generating a signal, which are preferably photo detectors 25, 25' and 25" are positioned for receiving each of the three partial beams 41', 42' and 43', respectively. If we assume that the beam is deflected from left to right as indicated by the arrow 18, the beam will reach the first direction 41 at a time $t_R$. At this time, a measuring device, which will serve to measure the time difference $\Delta t_R$, is set in motion. This is accomplished by the photo detecgtor 25 being hit by the sub-beam 41', which causes it to emit a start signal to the time measuring device 2. When the light beam has reached the direction 42, the photo detector 25' receives a partial beam 42' and produces a signal which, on one hand, stops the time measuring device, the time difference measured until this time is indicated as $\Delta t_R$ and then the time measuring device is restarted. The same process will be repeated when the partial light beam 43' associated with the third direction 43 strikes the photo detector 25" with the result that the time difference between the second and third direction will be measured as $\Delta t_{ZDA}$. When the light reaches the point of the surface 131 of the object 13 so that the diffusedly reflective property sends the beam in the direction of the sighting line 171 of photo detector 17, the signal produced by the photo detector 17 stops the time measuring device for the last occasion or instance during the measuring process and produces a time difference $\Delta t_d$. All these time differences $\Delta t_R$, $\Delta t_{ZDA}$ and $\Delta t_d$ are input as variables varied calculation values into a calculating unit 1, which determines the distance D of the surface 131 from reference plane 100 in accordance with $$\text{distance D} = \frac{A \cdot \cos\beta \cdot \sin[B \cdot \frac{\Delta t_{ZDA}}{\Delta t_R}(c - C\frac{\Delta t_d}{\Delta t_R})]}{\cos\alpha \cdot \sin[\alpha + \beta + B\frac{\Delta t_{ZDA}}{\Delta t_R}(c - C\frac{\Delta t_d}{\Delta t_R})]}$$

wherein A, B, C, c, $\alpha$, $\beta$ are device related constants and $\pi$ is the Ludolf coefficient. These constants can be stored, for example, as fixed calculation values in the calculating unit.

The calculating unit advantageously consists of a digital computer in particular a micro-processer. Since it is expedient for the time differences, which are to be input as variable calculation values, to be digitially represented, it is expedient for the time measuring device to comprise at least one counter which can be reset to a fixed starting value and can be read out in parallel. The counter can be started by a signal from the photo detector 25, can be intially stopped by a signal from the photo detectors 25' and 25", read out in parallel and then restarted, and then can be stopped by the signal from the photo detector 17 and read out in parallel. The time differences now prevailing in the digital form at the parallel outputs can thus be input into the calculating unit consecutive for processing. The precise length of time measurement is co-determined by the pulse train period of the counting pulse train and can also be varied by the latter.

The results of the calculation correctly indicates the measuring interval or distance D when the constants are selected as follows: A is the distance from the reference plane 100 from the beam deflector 10.

$$B = (\gamma_n/2) \cdot (\frac{\Delta t_{ZDA0}}{\Delta t_{R0}})$$

where $\Delta t_{ZDA0}$ and $\Delta t_{R0}$ are predeterminable starting times and $\gamma_n$ is the entire angle range over which the light beam passes. $C = 2\pi\nu_0 \cdot \Delta t_{R0}$ where $\nu_0$ is a predeterminable starting frequency. $c = \sin(2\pi\nu_0\, t_B/\Delta t_{R0})$ where $t_B = \theta_Z/2\pi\nu_0$ and $\theta_Z$, which is the angle between laser beam of source 12 and direction 42, is preferably selected to be 120° and $-60°$ respectively in response to whether at the beginning of the measuring process the light beam moves towards the photo detector 17 in the direction 18 or away from it. $\alpha$ is the angle between the second specific direction and the normal of the reference plane and $\beta$ is the angle between the sighting line 171 of the photo detector 17 and this normal. The reference plane 100 always runs parallel to the surface 131, which has the diffusedly reflective property, and the intersection point at which the second specific direction 42 and the sighting line 171 of the deflector 17 intersect always lies in the reference plane 100.

It should be noted that the measurement can be carried out independent of the deflection direction. Thus, the measurement can be carried out, when the beam is deflected in the direction of the arrow 18 and a measurement can be carried out directly thereafter when it is deflected in the opposite direction when the beam moves in a direction opposite to arrow 18, $\Delta t_d$ is measured first, then $\Delta t_{ZDA}$ and finally $\Delta t_R$.

The comparatively maximum measured rates is reached when measurement is carried out with each forward and backward movement of the light beam.

If a plurality of measurements are carried out and the measurement results are average, a high degree of measuring accuracy can be achieved.

If more than one set of three spcific directions are used, it is also possible to carry out a plurality of measurements simultaneously. In this case, it is expedient for the signal generators to consist of a photo detector having two or more sighting lines, which are dependent upon how many sets of three are present.

As mentioned hereinabove preferably the computing unit 1 utilizes a micro-processer. An exemplary type of micro-processer is an Intel 8080 which is sold by Intel Corporation, U.S.A., and whose configuration and operation are well known and are described in 8080 Assembly Language Manual and the 8080 Users Manual, which are published by Intel Corporation. Another embodiment is a system SAB 8080, which is described in Datan Book 1976/77 of Siemens Corporation under the title "Micro-Processer—Components, Systems SAB 8080". Assemblers program language pertaining to this micro-processer is published under the title "Assembler Program Language, Systems SAB 8080". Both of these books are based on the above-mentioned English language books of the Intel Corporation. It is submitted that with the knowledge contained in these books, the necessary program for the micro-processer can be selected by one skilled in the art of programming.

The general program execution steps are as follows. The program execution has the quantities for A, B, C, c, $\alpha$, $\beta$ and $\pi$, which are fixedly specific operands stored in the memory. It is also expedient to also fixedly store the quantities $\cos \beta$ and $\cos \alpha$. The determined time differences are successively input into computer in the form of digital quantities and are stored therein. Then the quotients indicated in the above mentioned formula are formed from the time differences and likewise most expediently stored. From the stored fixed values and the quotients from the different time differences which are determined during one measurement, respectively, the arguments for the two sine values are first determined by means of multiplication, addition and/or subtraction steps and then the respective sine value is determined. Subsequently, the first sine value is multiplied with A and $\cos \beta$ and then stored. The second sine value is multiplied with $\cos \alpha$ and stored and subsequently the quotient is formed from the two last stored values whose value is stored for use in further processing.

Although various minor modifications may be suggested by those versed in the art, it should be understood that I wish to employ within the scope of the patent warranted hereon, all such modifications as reasonably and properly come within the scope of my contribution to the art.

I claim:

1. In a device for contact-free measuring of a distance D of a surface of an object from a reference plane, said surface having a diffusedly reflective property, said device comprising a light source, which produces a sharply focused light beam; a beam deflector, which serves to deflect the light beam and to repeatedly pass it over the surface; a photo detector, which, within a predetermined angle range, responds only to light which reaches it along a sighting line, said photo detector being arranged with it's sighting line being aligned to the surface of the object to be measured and to be intersected at least zone-wise by a light beam which passes over the surface; and means for determining the distance D of the surface from the reference plane in response to a signal from the detector, the improvements comprising means for measuring intervals of time for travel of the deflected light beam between specific directions as the beam is deflected across the surface, said means for measuring providing a time difference $\Delta t_R$, which is the time of travel for the beam between a first predetermined fixed direction and a second predetermined fixed direction, a time difference $\Delta t_{ZDA}$, which is the time for the beam to move between said second direction and a third predetermined fixed direction, and a time difference $\Delta t_d$ which is the time for movement between said third direction and the time at which the photo detector receives a reflected beam from the surface, and said means for determining utilizing the time differences $\Delta t_R$, $\Delta t_{ZDA}$ and $\Delta t_d$ as varying values to determine the distance D in accordance with $$\text{distance } D = \frac{A \cdot \cos \beta \cdot \sin (B \frac{\Delta t_{ZDA}}{\Delta t_R} (c - C \frac{\Delta t_d}{\Delta t_R}))}{\cos \alpha \cdot \sin (\alpha + \beta + B \frac{\Delta t_{ZDA}}{\Delta t_R} (c - C \frac{\Delta t_d}{\Delta t_R}))}$$

wherein A is the distance from the reference plane and the beam deflector;

$$B = (\gamma_n/2) \cdot \frac{(\Delta t_{ZDA0})}{\Delta t_{R0}}$$

wherein $\Delta t_{ZDA0}$ and $\Delta t_{R0}$ are predetermined starting times and $\gamma_n$ is the entire angle range for the deflected light beam; $C = 2\pi \nu_O \cdot \Delta t_{R0}$ where $\nu_O$ is a predeterminable starting frequency; $c = \sin (2\pi \nu_O t_B/\Delta t_{R0})$ where $t_B = \theta Z/2\pi \nu_O$ and $\theta_Z$ being the angle between the light beam from the source and the second predetermined direction; $\alpha$ is the angle between the second predetermined direction and a normal to the reference plane; $\beta$ is the angle between the sighting line and the normal of the reference plane; and $\tau$ is Ludolf coefficient which constitutes a fixed calculated value.

2. In a device according to claim 1, wherein the means for measuring intervals of time includes three separate means for generating signals, each of said means for generating signals being assigned to one of the three fixed directions and generating a signal when the light beam points in the assigned direction.

3. In a device according to claim 2, wherein at least one of said means for generating a signal consists of a photo detector having one sighting line.

4. In a device according to claim 2, wherein the means for measuring includes a beam splitter disposed in the path of the deflected light beam, said beam splitter directing a partial beam towards said means for generating a signal, each of said means for generating a signal being a photo detector responding only to light which reaches it along a given sighting line.

5. In a device according to claim 2, wherein said means for measuring time intervals includes at least one counter, said counter being reset to a fixed starting value and being readable in parallel, said counter being started, and/or stopped and read out in parallel by a signal from means for generating a signal assigned to the first direction, said counter being initially stopped, read out in parallel and then restarted by a signal from the means for generating a signal assigned to the second and third directions and can be stopped, read out in parallel and started by a signal from the photo detector which receives a light reflected from the surface of the object.

6. In a device according to claim 1, wherein the means for determining includes a digital computer.

7. In a device according to claim 6, wherein the digital computer is a micro-processer.

8. In a device for contact-free measuring of a distance of a surface of an object from a reference plane, said surface having a diffusedly reflective property, said device comprising a light source, which produces a sharply focused light beam; a beam deflector, which serves to deflect the light beam and to repeatedly pass it over the surface; a photo detector, which, within a predeterminable angle range, responds only to light which reaches it along a given direction, said photo detector being arranged with its given direction being directed at the surface of the object to be measured and to be intersected at least zone-wise by a light beam which passes over the surface; and means for determining the distance of the surface from the reference plane in response to a signal from said detector, the improvements comprising means for measuring intervals of time for travel of the deflected light beam between at least two specific directions of the beam, and between at least one of said two directions and a direction at which the photo detector responds, and said means for determining utilizing the time intervals to determine the speed of the deflection and determine the distance of the surface from a reference plane.

9. In a device according to claim 8, wherein the means for measuring incudes a beam splitter disposed in the path of the deflected beam, and at least two additional photo detectors for detecting partial beams of light from said splitter, said detectors being arranged to determine when the eeflected beam is in each of said directions.

10. In a device according to claim 9, wherein the means for measuring time includes at least one counter which can be reset to a starting value and can be read out in parallel, said counter being started and/or stopped and read out in parallel by a signal from each of the additional photo detectors, and can be stopped, read out in parallel and/or started by a signal from the photo detector which receives a light beam reflected from the surface.

* * * * *